United States Patent [19]

Tairaka

[11] Patent Number: 4,649,163

[45] Date of Patent: Mar. 10, 1987

[54] FLAME-RETARDANT POLYURETHANE FOAM AND POLYOL COMPOSITION THEREFOR

[75] Inventor: Yoshihiko Tairaka, Sakai, Japan

[73] Assignee: Takeda Chemical Industries, Ltd., Osaka, Japan

[21] Appl. No.: 804,254

[22] Filed: Dec. 3, 1985

[30] Foreign Application Priority Data

Dec. 7, 1984 [JP] Japan ................. 59-259774

[51] Int. Cl.$^4$ .............................. C08G 18/14
[52] U.S. Cl. .................... 521/107; 252/182; 521/129; 521/168; 521/169; 521/173
[58] Field of Search ............... 252/182; 521/107, 129, 521/168, 169, 173

[56] References Cited

U.S. PATENT DOCUMENTS

| | | | |
|---|---|---|---|
| 4,485,196 | 11/1984 | Speranza et al. | 521/173 |
| 4,595,711 | 6/1986 | Wood | 521/173 |
| 4,596,665 | 6/1986 | Gonzalez et al. | 521/173 |

*Primary Examiner*—Maurice J. Welsh
*Attorney, Agent, or Firm*—Wenderoth, Lind & Ponack

[57] ABSTRACT

A polyol composition comprising
(a) a polyether polyol with an average molecular weight of 2,000 to 10,000,
(b) an adduct of a carboxylic acid having not less than 8 carbon atoms with ethylene oxide or both ethylene oxide and propylene oxide and
(c) a diol with an average molecular weight of 62 to 400, having one or more primary hydroxyl groups;

in a ratio of (88 to 98):(2 to 8):(0 to 4) by weight is suitable for the production of flame-retardant flexible polyurethane foam and a flame-retardant flexible polyurethane foam produced by reacting
(i) the above polyol composition with
(ii) a polyisocyanate
in the presence of
(iii) water,
(iv) both a foam-setting agent for slab foam and a foam-setting agent for HR foam
(v) both a metal-containing catalyst and a tertiary amine catalyst and
(vi) a flame retardant comprising a triarylphosphate
not only has an excellent flame retardant effect but also causes no discoloration of the foam-covering material.

5 Claims, No Drawings

FLAME-RETARDANT POLYURETHANE FOAM AND POLYOL COMPOSITION THEREFOR

The present invention relates to a polyol composition for urethane foam production, being used to produce flexible non-flammable urethane foam mainly by the slab method or the hot-cure mold method, and a flame retardant flexible polyurethane foam prepared therefrom.

Flexible urethane foam is widely used as a favorable cushion material for vehicles, furniture, bedding, etc.

With the expansion of its applicability, however, flexible urethane foam, mainly that used for automobile fittings, has come to be severely regulated for its flame-resistance.

The non-flammabilization of flexible foam has been achieved by employing two methods: (1) a method using titanium oxide, zinc oxide, chlorinated paraffin, or other flame retardants, and (2) a method using condensation-halogenated phosphoric acid ester as a flame retardant. However, in the method (1), it is hardly possible to obtain a polyurethane foam in which flame retardants are contained homogeneously. In the method (2), the tendency of the foams to scorch during manufacture increases and cloth coming in contact with foam is subject to discoloration. The inventor, after studying the non-flammabilization of flexible urethane foam, found that a flame-retardant, flexible urethane foam causing no discoloration of cloth can be obtained from a polyol composition by using foam-setting agents for slab and HR foam and a triaryl phosphate flame retardant in combination, and found that scorching does not form when foam is prepared. by the above method.

The present invention relates to:

1. A polyol composition for polyurethane production, which comprises
   (a) a polyether polyol with an average molecular weight of 2,000 to 10,000,
   (b) an adduct of a carboxylic acid having not less than 8 carbon atoms with ethylene oxide (hereinafter referred to as EO) or both EO and propylene oxide (hereinafter referred to as PO) and
   (c) a diol with an average molecular weight of 62 to 400, having one or more primary hydroxyl groups; in a ratio of (88 to 98):(2 to 8):(0 to 4) by weight, 2. A flame-retardant flexible polyurethane foam produced by reacting
   (i) the above polyol composition with
   (ii) a polyisocyanate in the presence of
   (iii) water,
   (iv) both a foam-setting agent for slab foam and a foam-setting agent for HR(high resilience) foam,
   (v) both a metal-containing catalyst and a tertiary amine catalyst and
   (vi) a flame retardant comprising a triarylphosphate.

The composition involved in this invention can be obtained by mixing the said components at the specified ratio.

As component-(a) any polyether polyol can be used when its average molecular weight is 2,000–10,000,e.g. adduct of glycerol with PO or both PO and EO, and adduct of granulated sugar-glycerol with PO, and is exemplified by Actcol 79-56[Adduct of glycerol with PO (Average molecular weight: 3000), Takeda Chemical Industries, Ltd.], Actcol 35-34[Adduct of glycerol with PO (Average molecular weight: 5000), Takeda Chemical Industries, Ltd.], Actcol TM-56[Adduct of glycerol-sucrose with PO (Average molecular weight: 6000), Takeda Chemical Industries, Ltd.], Actcol GF-56[Adduct of glycerol with both PO and EO (EO content: about 10 weight %, Average molecular weight: 3000), Takeda Chemical Industries, Ltd.], Actcol MF-25[Adduct of glycerol with both PO and EO (EO content: about 15 weight %, Average molecular weight: 3000), Takeda Chemical Industries, Ltd.], etc.

Component-(b) is an adduct of an aliphatic carboxylic acid having not less than 8 carbon atoms with EO or both EO and PO. The following carboxylic acids can be used as the aliphatic carboxylic acid having not less than 8 carbon atoms: natural complex fatty acids with 10–18 carbon atoms, e.g. coconut oil fatty acid, rosin fatty acid and tall oil fatty acid; dimer acid and dihydroxystearic acid, both of which are derivatives from the said fatty acids; and alicyclic carboxylic acids such as tetrahydrophthalic and hexahydrophthalic acids. When an adduct of the carboxylic acid with EO is produced; 2–20 moles, preferably 5–10 moles, of EO is reacted per 1 mole of the original carboxylic acid. When an adduct of the carboxylic acid with both EO and PO is produced; 2–20 moles, preferably 5–10 moles, of EO, and less than 10 moles, preferably less than 5 moles of PO are reacted per 1 mole of the original carboxylic acid, where the total amount of EO and PO is less than 20 moles, preferably less than 15 moles. If the amount of EO added is too little, the compatibility between Component-(a) and Component-(c) will be lowered. If it is excessive, the components will solidify and become difficult to use. If PO is added excessively, the flame-retardant effect of urethane foam will be degraded.

Component-(c) is a diol with a molecular weight of 62–400, having one or more primary hydroxyl groups within its molecule. Alkylenediol (e.g. 1,4-butylene glycol, ethylene glycol, etc.) and polyoxyalkylenediol (e.g. diethylene glycol, polyethylene glycol, etc.) can be used.

The mixing ratio of Components-(a), -(b) and -(c) is 88–98% : 2–8% : 0–4%, preferably 91–97% : 3–6% : 0.5–3.0% by weight. If Component-(a) is excessive, the flame-retardant effect will be degraded; if it is too little, foaming workability will be lowered. If Component-(b) is excessive, foam disintegration or shrinkage will be caused; if it is too little, an insufficient flame-retardant effect will be obtained. Component-(c), not specially required, can be added at a rate of less than 4% by weight. If it is added in the proper percentage, a higher flame-retardant effect will be obtained. If it is added excessively, no favorable foam will be obtained due to foam shrinkage and closed-cell formation in the foam produced.

In producing the present composition, three mixing methods are possible: (1) Components-(a) and -(b) are mixed with each other and then Component-(c) is added, (2) Components-(a) and -(c) are mixed with each other and then Component-(b), is added, and (3) Components-(b) and -(c) are mixed with each other and then Component-(a) is added.

The polyol composition specified in this invention can contain substances other than the three components, e.g. a toner for foam coloring (e.g. Phthalocyanine Blue, carbon black, etc.) and an antioxidant (e.g. phosphite such as trisnonylphenylphosphite, diisodecylpentaerythritoldiphosphite, etc.). Such additives are required to be contained at a ratio of not more than 5% by weight, preferably not more than 3% by weight to the overall weight of Components-(a), -(b) and -(c).

The polyol composition specified in this invention is applicable to a variety of purposes for polyurethane production, being especially suitable as a polyol component in producing flame-retardant urethane foam.

Hereinafter described is a flame-retardant flexible urethane foam using the polyol composition presented in the present invention.

The flame-retardant flexible urethane foam of the present invention can be produced by reacting the polyol composition mentioned above with a polyisocyanate in the presence of water, a foam-setting agent for slab foam, a foam-setting agent for HR foam, a metal-containing catalyst, a tertiary amine catalyst and a flame retardant comprising a triarylphosphate.

The polyisocyanate is one containing two or more isocyanate groups in one molecule. As example of the polyisocyanate, tolylene diisocyanate (TDI), diphenylmethane diisocyanate and a mixture of two or more of these polyisocyanates, while TDI-80 (a mixture of 80% of 2,4-tolylenediisocyanate and 20% of 2,6-tolylenediisocyanate) is preferable. These polyisocyanates can be used in an amount of 0.9 to 1.3 chemical equivalent relative to the active hydrogen (hydrogen of hydroxyl in the polyol composition and hydrogen in water), preferably 1.0 to 1.2 chemical equivalent.

Water is used as a blowing agent and the amount of water to be used is usually in the range of 2.4 to 6.0 weight parts per 100 weight parts of polyol components-(a), -(b) and -(c) (hereinafter referred to as total polyols), preferably 3.6 to 4.8 weight parts, while it depends on the foam density required. The use of a flowing agent is recommended for slab-hot molding and in combination with HR foam a weight ratio of 1:3–3:1, preferably 2:1–1:2 be used. The foam-setting agent for slab-hot molding is a polyether-modified silicon with an average molecular weight of 2,000 or more, being available as a silicon foam-setting agent for slab foam or that for hot molding: F-242T, F-244 and F-258 (Shin-etsu Chemical Co., Ltd.); B-8017, B-3752 and B-8202 (Th.Goldschimdt A.G.); L-520, L-540 and L-5740 (Nippon Unicar Co., Ltd.); and SH-190, SH-194, SRX-298 and SRX-294A (Toray Silicon Co., Ltd.). The foam-setting agent for HR foam is a polyether-modified silicon with an average molecular weight of 1,500 or less, being available as a foam-setting agent for HR foam: F-121 and F-122 (Shin-etsu Chemical Co., Ltd.); B-4113, B-8612 and B-8650 (Th. Goldschmidt Co., Ltd.); L-5305, L-5309 and L-3600 (Nippon Unicar Co., Ltd.); and SRX-253 and SRX-274C (Toray Silicon Co., Ltd.). The amount of foam-setting agents to be added is usually 0.5–3.0 parts by weight, preferably 1.0–2.0 parts by weight, per 100 parts by weight of total polyols.

As a metal-containing catalyst, there may for example be mentioned tin compound (e.g. stannous octoate, dibutyltindilaurate, etc.) and lead compound (e.g. lead hexoate, etc.). The metal-containing catalyst is usually used in an amount ranging 0.03 to 0.5 weight part per 100 weight parts of the total polyols.

The tertiary amine catalyst may be any of an organic tertiary amine. As the tertiary amine catalyst, there may be mentioned triethylene diamine, pentamethyldiethylenetriamine, tetramethylethylene, diamine, TOYOCAT NP ®, TOYOCAT ET ® (Toyo Soda Manufacturing Co., Ltd.), N-ethylmorpholine and dimethylbenzylamine. The amount of the tertiary amine catalyst used is in the range of 0.1 to 0.5 weight parts per 100 weight parts of the total polyols.

As a flame retardant, the use of a triaryl phosphate is recommended, e.g. Reofos-35, Reofos-65 (Ajinomoto Co., Inc.) and CDP (Daihachi Chemical Industries, Ltd.). In combination with a triaryl phosphate flame retardant, an organic-phosphorous flame retardant having hydroxyl group(s) can be used, e.g. Pegacol-82 (Mobil Oil Co., Ltd.) and Fireshut (Ihara Chemical Industry Co., Ltd.). When triaryl phosphate is used alone, the amount of the flame retardant to be added is 5–20 parts by weight, preferably 10–15 parts by weight, per 100 parts by weight of the total polyols. When both a triaryl phosphate flame retardant and an organic-phosphorous flame retardant with hydroxyl groups are used, the amounts of the flame retardants to be added are 5–15 parts by weight, preferably 8–12 parts, by weight and 4 or less parts by weight, preferably 1–2 parts by weight, respectively. The flame retardant quality is improved by adding such an organic-phosphorous flame retardant; however, foam shrinkage will be caused if it is added excessively.

In the production of the flame-retardant flexible polyurethane foam of the present invention, additives such as toner (e.g. Phthalocyanine Blue, carbon black), antioxidizing agent (phosphite such as trisnonylphenylphosphite, diisodecylpentaerythritoldiphosphite may be used in addition to the above-defined components. Total amount of these additives are not higher than 5 weight parts per 100 weight parts of the total polyols.

Foam production using the said materials can be done in the same manner as the conventional foam production process. For example, the foam can be prepared firstly by premixing the polyol composition, the foam-setting agents, water, the tertiary amine catalyst and other additives, secondly by mixing the tin catalyst, thirdly by mixing the polyisocyanate to the mixture and finally by pouring the mixture into an open mold.

The polyol of the present invention is suitable for production of flame-retardant flexible polyurethane foam by the method shown above and the flame retardant flexible polyurethane foam of the present invention not only has an excellent flame-retardant effect but also causes no discoloration of the foam-covering material.

EXAMPLES 1 to 6

As shown in Table 1, various polyol components were mixed with each other to produce Polyol compositions A through F (Polyol compositions falling within the scope of claim 1) and X through Z (Polyol compositions falling outside the scope of claim 1).

TABLE 1

| Component | Example 1 | Example 2 | Example 3 | Example 4 | Example 5 | Example 6 | Control 1 | Control 2 | Control 3 |
|---|---|---|---|---|---|---|---|---|---|
| Polyol composition | A | B | C | D | E | F | X | Y | Z |
| Actcol 79-56[1] | 94 | 94 | 94 | | | | 90 | | 98 |
| Actcol GF-56[2] | | | | 95 | | | | 90 | |
| Actcol MF-25[3] | | | | | 94 | | | | |
| Actcol TM-56[4] | | | | | | 93 | | | |
| Additive-1[5] | 4 | | | 5 | | | 10 | | |
| Additive-2[6] | | 5 | | | 5 | | | | |
| Additive-3[7] | | | 4 | | | 5 | | 4 | |
| Diethylene glycol | 2 | | 2 | | 1 | | | 6 | 2 |
| 1,4-butylene | | 1 | | | | 2 | | | |

TABLE 1-continued

| | Example | | | | | | Control | | |
|---|---|---|---|---|---|---|---|---|---|
| Component | 1 | 2 | 3 | 4 | 5 | 6 | 1 | 2 | 3 |
| glycol | | | | | | | | | |

Note: Figures are presented in % by weight.
[1]Adduct of glycerol with PO (average molecular weight: 3,000), Takeda Chemical Industries, Ltd.
[2]Adduct of glycerol with PO/EO (EO content: about 10 weight %, average molecular weight: 3,000), Takeda Chemical Industries, Ltd.
[3]Adduct of glycerol with PO/EO (EO content: about 15 weight %, average molecular weight: 3,000), Takeda Chemical Industries, Ltd.
[4]Adduct of glycerol-sucrose with PO (average molecular weight: 6,000, hydroxyl number: 56)
[5]Adduct of lauric acid with 5 moles EO
[6]Adduct of rosin fatty acid with 5 mole EO and 3 mole PO
[7]Adduct of hexahydrophthalic acid with 2 mole EO

EXAMPLE 7

Polyol composition-A, diethylene glycol, Reofos-35, Silicon B-8202 and B-8612, and the aqueous solution of triethylenediamine (triethylenediamine : water=0.1:4.0), were put into a 5-liter polyethylene beaker at a ratio of 8 times the amount specified in Table 2, and was stirred for 30 seconds. Stannous octoate was added next, the solution was then stirred for 15 seconds. The resulting solution was kept at 25° C.±2° C. Takenate-80 kept at 25° C.±2° C. was then added in an amount 8 times that specified in Table 2, the solution was immediately stirred for approx. 10 seconds. The resulting solution was poured into a box (35×35×20 cm) and urethane foam was produced.

After the urethane foam obtained was kept standing overnight, a sample piece was cut away in accordance with MVSS-302 and subjected to a flammability test. The results obtained are shown in Table 2.

A sample piece (2.5×10×1.0 cm) was cut away from the urethane foam obtained, being covered with a piece of polyester-nylon cloth of equal size (Polyester:nylon=70:30, gray in color), and the cloth fixed by staples. After being heated at 100° C. for 200 hours in an oven, the cloth piece showed no discoloration.

EXAMPLES 8-12

Using the polyol compositions shown in Examples 1-6 and other materials as shown in Table 2, polyurethane foams were produced in the same manner as that shown in Example 7. The resulting foams were subjected to a flammability test. The results obtained are shown in Table 2. The discoloration of cloth pieces was examined in the same manner as shown in Example 7. No discoloration was observed in any case.

COMPARATIVE EXAMPLES 1-5

Using the materials shown in Table 3, polyurethane foams were produced in the same manner as that shown in Example 7. The resulting foams were subjected to a flammability test. The results obtained are shown in Table 3.

TABLE 2

| Example | 7 | 8 | 9 | 10 | 11 | 12 |
|---|---|---|---|---|---|---|
| Polyol composition-A | 100 | | | | | |
| Polyol composition-B | | 100 | | | | |
| Polyol composition-C | | | 100 | | | |
| Polyol composition-D | | | | 100 | | |
| Polyol composition-E | | | | | 100 | |
| Polyol composition-F | | | | | | 100 |
| Reofos-35 | 10 | 12 | 12 | 12 | 10 | 15 |
| Pegacol-82 | 1 | | | | 1 | 1 |
| Triethylenediamine[8] | 0.1 | 0.1 | | 0.1 | 0.1 | 0.1 |
| TOYOCAT NP[9] | | | 0.1 | | | |
| H$_2$O | 4.0 | 4.0 | 4.0 | 4.0 | 4.0 | 4.0 |
| B-8202 | 0.5 | 1.0 | 0.5 | | | 0.5 |
| B-3752 | | | | 1.0 | | |
| F-242T | | | | | 1.0 | |
| SRX-274C | | | | 1.0 | | 1.0 |
| B-8612 | 1.0 | 1.0 | 1.0 | | 1.0 | |
| Stanoct[10] | 0.12 | 0.12 | 0.1 | 0.07 | 0.1 | 0.07 |
| Takenate-80[11] | 56 | 55 | 55 | 53 | 56 | 56 |
| Flame-retardant quality (MVSS-302) | Did not reach the 1st standard line. | Same as left | Same as left | Same as left | Same as left | Same as left |

[8,9]Amine catalysts, Toyo Soda Manuf. Co., Ltd.
[10]Stannous octoate, Yoshitomi Pharmaceutical Industries, Ltd.
[11]Tolylene diisocyanate (TDI-80), Takeda Chemical Industries, Ltd.

TABLE 3

| Comparative Examples | 1 | 2 | 3 | 4 | 5 |
|---|---|---|---|---|---|
| Polyol composition-X | 100 | | | | |
| Polyol composition-Y | | 100 | | | |
| Polyol composition-Z | | | 100 | | |
| Polyol composition-A | | | | 100 | |
| Actcol GF-56 | | | | | 100 |
| Reofos-35 | 15 | 12 | 12 | 12 | 12 |
| Pegacol-82 | | | | 1.0 | |
| Triethylenediamine | 0.1 | 0.1 | 0.1 | 0.1 | 0.1 |
| H$_2$O | 4.0 | 4.0 | 4.0 | 4.0 | 4.0 |
| B-8202 | 0.5 | 0.5 | 0.5 | | |
| SRX-298 | | | | | 0.5 |
| B-8612 | 1.0 | 1.0 | 1.0 | 1.5 | 1.0 |
| Stanoct | 0.15 | 0.05 | 0.20 | 0.15 | 0.1 |
| Takenate-80 | 54 | 60 | 55 | 55 | 48 |
| Foaming state | Disintegrated, no foam obtained | Shrinked | Favorable | Disintegrated | Favorable |
| Flame-retardant quality (MVSS-302) | — | — | Flaming rate: 9.5 cm/min. | — | Self-extinguishability: 88 mm, 53 sec. |

I claim:

1. A polyol composition for polyurethane production, which comprises
   (a) a polyether polyol with an average molecular weight of 2,000 to 10,000,
   (b) an adduct of a carboxylic acid having not less than 8 carbon atoms with ethylene oxide or both ethylene oxide and propylene oxide and
   (c) a diol with an average molecular weight of 62 to 400, having one or more primary hydroxyl groups
   in a ratio of (88 to 98):(2 to 8):(0 to 4) by weight.

2. A polyol composition as claimed in claim 1, wherein the polyether polyol (a) is an polyoxypropylene triol, the adduct (b) is an adduct of a carboxylic acid having not less than 8 carbon atoms with ethyleneoxide (2 to 20 moles of ethylene oxide per mole of the carboxylic acid), the diol (c) is diethylene glycol, and the ratio of (a):(b):(c) is (91 to 97):(2 to 20):(0.5 to 3) by weight.

3. A flame-retardant flexible polyurethane foam produced by reacting
   (i) a polyol composition comprising
      (a) a polyether polyol with an average molecular weight of 2,000 to 10,000,
      (b) an adduct of a carboxylic acid having not less than 8 carbon atoms with ethylene oxide or both ethylene oxide and propylene oxide and
      (c) a diol with an average molecular weight of 62 to 400, having one or more primary hydroxyl groups
   in a ratio of (88 to 98):(2 to 8):(0 to 4) by weight, with
   (ii) a polyisocyanate in the presence of
   (iii) water,
   (iv) both a foam-setting agent for slab foam and a foam-setting agent for HR foam
   (v) both a metal-containing catalyst and a tertiary amine catalyst and
   (vi) a flame retardant comprising a triarylphosphate.

4. A flame-retardant flexible polyurethane foam as claimed in claim 3, wherein the flame retardant (vi) consists of both a triaryl phosphate and an organic phosphoric compound having two hydroxyl groups.

5. A flame-retardant flexible polyurethane foam as claimed in claim 3, wherein 8 to 12 weight parts of triarylphosphate and 1 to 2 weight parts of an organic phosphoric compound as the flame retardant (vi) are used relative to 100 weight parts of the total amount of the components (a), (b) and (c).